United States Patent
Jain

(10) Patent No.: US 8,037,550 B2
(45) Date of Patent: Oct. 18, 2011

(54) STRETCHABLE CHEMICAL PROTECTIVE MATERIAL

(75) Inventor: Mukesh K. Jain, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 786 days.

(21) Appl. No.: 12/140,493

(22) Filed: Jun. 17, 2008

(65) Prior Publication Data

US 2011/0167547 A1  Jul. 14, 2011

Related U.S. Application Data

(63) Continuation-in-part of application No. 12/024,395, filed on Feb. 1, 2008, now abandoned.

(51) Int. Cl.
- *A62B 17/00* (2006.01)
- *A41D 31/02* (2006.01)
- *A41D 31/00* (2006.01)

(52) U.S. Cl. .......... 2/457; 2/87; 2/272; 428/196; 428/76

(58) Field of Classification Search .................... 135/87, 135/115, 119, 96, 137, 93; 428/196, 76; 2/84, 87, 457, 202

See application file for complete search history.

(56) References Cited

U.S. PATENT DOCUMENTS

| | | | |
|---|---|---|---|
| 4,045,609 A * | 8/1977 | Hart | 442/227 |
| 4,194,041 A | 3/1980 | Gore et al. | |
| 4,201,822 A * | 5/1980 | Cowsar | 442/64 |
| 4,515,761 A | 5/1985 | Plotzker | |
| 4,532,316 A | 7/1985 | Henn | |
| 4,862,730 A | 9/1989 | Crosby | |
| 4,935,287 A | 6/1990 | Johnson | |
| 4,942,214 A | 7/1990 | Sakhpara | |
| 5,017,424 A | 5/1991 | Farnworth | |
| 5,209,969 A | 5/1993 | Crowther | |
| 5,221,572 A | 6/1993 | Meunier | |
| 5,529,830 A | 6/1996 | Dutta | |
| 5,869,193 A | 2/1999 | Langley | |
| 6,077,793 A | 6/2000 | Hatjasalo | |
| 6,395,383 B1 | 5/2002 | Maples | |
| 6,509,078 B1 * | 1/2003 | Beckmann | 428/71 |
| 6,792,625 B2 | 9/2004 | Hexels | |
| 6,852,903 B1 * | 2/2005 | Brown et al. | 588/299 |
| 6,892,725 B2 * | 5/2005 | Frund | 128/201.29 |
| 7,062,788 B2 | 6/2006 | Tremblay-Lutter et al. | |
| 7,549,431 B1 * | 6/2009 | Farnworth et al. | 135/115 |
| 2002/0192657 A1 * | 12/2002 | Erwin et al. | 435/6 |
| 2003/0200966 A1 * | 10/2003 | Frund, Jr. | 128/201.29 |

(Continued)

FOREIGN PATENT DOCUMENTS

WO    WO03/037443    5/2003

(Continued)

OTHER PUBLICATIONS

International Search Report; PCT/US2009/001398; 16 pages.

*Primary Examiner* — Bobby Muromoto, Jr.
(74) *Attorney, Agent, or Firm* — Carol A. Lewis White

(57) ABSTRACT

A stretchable chemical protective material is described comprising a selectively permeable chemical protective film and an elastic textile. Further described are methods for making a stretchable chemical protective material and methods of using the same. Materials made from these methods may have improved flex durability. Garments made from these materials may have improved heat loss.

33 Claims, 4 Drawing Sheets

U.S. PATENT DOCUMENTS

| | | | |
|---|---|---|---|
| 2004/0235756 A1* | 11/2004 | Barness et al. | 514/23 |
| 2004/0259446 A1 | 12/2004 | Jain et al. | |
| 2005/0238872 A1 | 10/2005 | Kennedy et al. | |
| 2005/0266749 A1* | 12/2005 | De Ruiter | 442/59 |
| 2006/0205300 A1 | 9/2006 | Howard et al. | |
| 2007/0134483 A1* | 6/2007 | Bohringer et al. | 428/297.4 |
| 2007/0190166 A1 | 8/2007 | Howard et al. | |
| 2007/0286877 A1* | 12/2007 | Axtell et al. | 424/402 |
| 2008/0289088 A1* | 11/2008 | Howard, Jr. | 2/457 |
| 2009/0151058 A1* | 6/2009 | Farnworth et al. | 2/457 |
| 2009/0300832 A1* | 12/2009 | Howard, Jr. | 2/457 |
| 2009/0304759 A1* | 12/2009 | Howard, Jr. | 424/402 |
| 2010/0223716 A1* | 9/2010 | Howard, Jr. | 2/457 |
| 2010/0313340 A1* | 12/2010 | Du et al. | 2/457 |
| 2010/0313759 A1* | 12/2010 | Bones | 96/12 |
| 2011/0113538 A1* | 5/2011 | von Blucher et al. | 2/456 |

FOREIGN PATENT DOCUMENTS

| | | |
|---|---|---|
| WO | WO03/068010 | 8/2003 |

* cited by examiner

US 8,037,550 B2

STRETCHABLE CHEMICAL PROTECTIVE MATERIAL

CROSS REFERENCE TO RELATED APPLICATIONS

This application is a continuation-in-part of commonly owned and U.S. patent application Ser. No. 12/024,395, filed Feb. 1, 2008 now abandoned.

FIELD OF THE INVENTION

The present invention relates to stretchable chemical protective material and durable, low heat-stress chemical protective garments. Chemical protective garments are made from a stretchable chemical protective material comprising a selectively permeable film which significantly restricts chemical and biological materials and is permeable to moisture vapor.

BACKGROUND OF THE INVENTION

Varying levels of threats from chemical and biological agents have resulted in chemical protective garments based on multiple technologies. For example, to achieve protection from the highest level of chemical and biological challenges, garments may be formed from impermeable chemical protective materials which prevent toxic agents from passing through the material and to the body of the wearer. Likewise, these impermeable materials are non-breathable, preventing the passage of moisture vapor through the impermeable material and away from the body of a wearer. Protective garments formed from adsorptive materials, such as activated carbon-based materials, adsorb toxic agents to which the material is exposed. Adsorptive materials have a finite capacity to adsorb toxic agents. This capacity to adsorb toxic agents is readily depleted by indiscriminant adsorption of non-toxic chemicals present in the environment. Protective garments may also be made from selectively permeable materials that significantly restrict liquid and vapor chemical agents from passing through the protective garment, while allowing moisture vapor to pass through the garment and away from the body of a wearer.

Protective garments are frequently designed having multiple layers providing a wearer protection against a combination of anticipated challenges. Individual layers are selected for desired properties and incorporated into a protective multilayer material which is then formed into garments. The protective multilayer materials are often thick and/or stiff. Consequently, protective garments formed from these materials can be bulky, stiff and/or non-form fitting.

SUMMARY OF THE INVENTION

A chemical protective suit is described comprising a form-fitting bodysuit. The form-fitting body suit comprises a stretchable chemical protective laminate comprising a selectively permeable chemical protective film and an elastic textile that are joined by an adhesive. The stretchable chemical protective laminate has low permeation to toxins such as mustard gas (HD) and acrylonitrile. In one embodiment, a form-fitting body suit provides both good chemical protection and low heat stress. For example, a stretchable chemical protective garment has a high heat loss, such as a heat loss greater than 100 W/m² at 35° C. and 60% RH, and provides durable chemical protection.

Further described herein are methods for laminating stiff selectively permeable chemical protective films to elastic textile to form stretchable chemical protective laminates that have high elongation with good recovery.

In another embodiment, methods are further described for making a durable chemical protective laminate from stiff selectively permeable chemical protective films, wherein the laminate has low permeation to chemical vapor after flexing and laundering.

DETAILED DESCRIPTION OF THE INVENTION

With reference to the Figures, a high heat loss chemical protective suit is described comprising a form-fitting bodysuit (FIG. 5) which is made from a stretchable chemical protective material.

Figure 1:
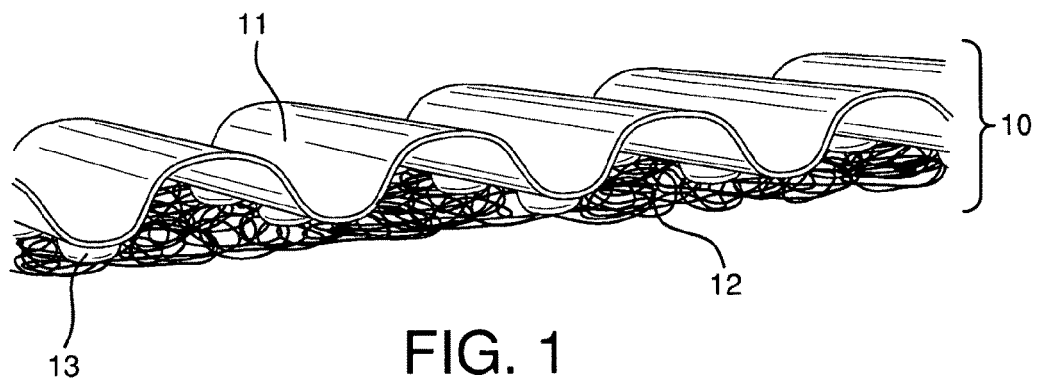
FIG. 1 is a schematic cross-section of a stretchable laminate.
Figure 5:
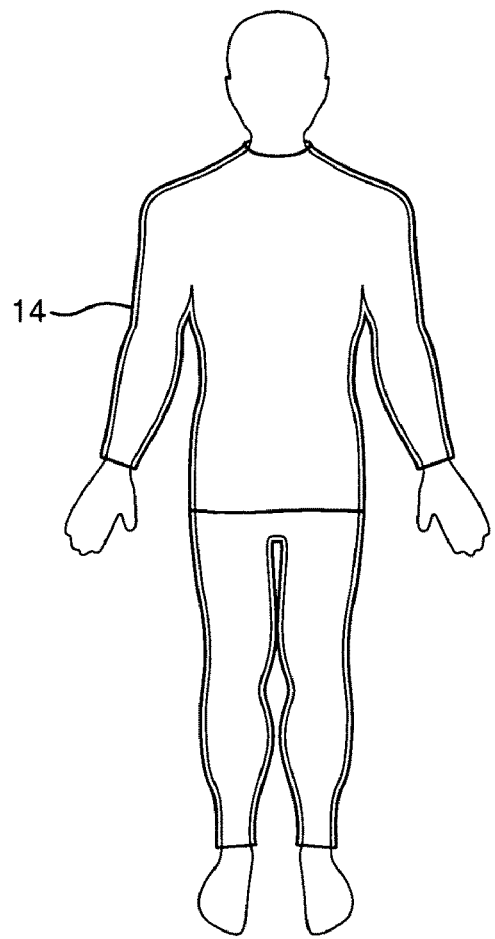
FIG. 5 is a schematic representation of a form-fitting protective suit.

FIG. 1 exemplifies a cross-sectional schematic of a stretchable chemical protective material in the form of a laminate (10) suitable for use in making the form-fitting garment (FIG. 5). The stretchable chemical protective laminate (10) comprises a selectively permeable chemical protective film (11) and an elastic textile (12) that are joined by an adhesive (13). For use herein, the stretchable chemical protective laminate (10) is considered selectively permeable if it has a moisture vapor transmission rate of greater than about 1000 g/m²/day, and a permeation to acrylonitrile of less than 6 μg/cm², or a permeation to HD of less than 20 μg/cm², or both, when tested according to the methods described herein.

Selectively permeable chemical protective films comprise polymers which significantly restrict the passage of noxious or harmful chemical and biological toxins while providing permeability of moisture vapor to decrease heat-stress to the wearer of a garment comprising the films. Selectively permeable chemical protective films (11) may include films used in laminates sold under the tradenames Gore™Chempak®-Selectively Permeable Fabric. Also, polymers that may be suitable for these applications comprise, for example, polyamine polymers, such as those described in U.S. Pat. No. 6,395,383, sulfonated aromatic polymers such as those described in U.S. Pat. Pub. No. 2004/0259446 which are hereby incorporated herein in their entirety, fluorinated ionomers including those materials sold under the tradename Nafion™ and described in U.S. Pat. No. 4,515,761, chitosan based polymers such as described in U.S. Pat. Publication 2007/0190166, cellulose acetate based materials such as those described in U.S. Pat. No. 6,792,625, polyvinyl alcohol based polymer such as those described in U.S. Pat. No. 5,869,193, PVOH and PEI blend materials such as those described in WO Pat. Publication No. 03/037443, polyurethane and PEI blend polymers such as those described in U.S. Pat. Pub. 2006/0205300, and polymers and copolymers containing ethylene vinyl alcohol such as those described in WO Publication No. 03/068010.

Figure 2:
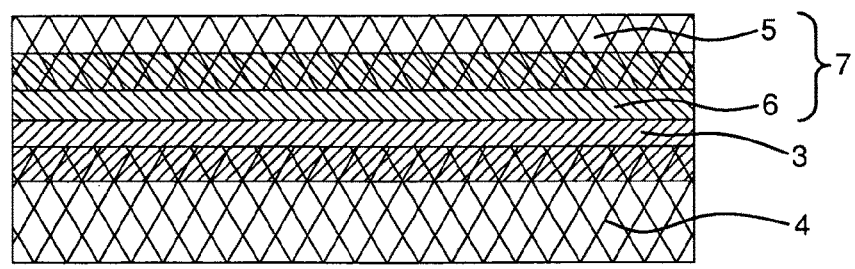
FIG. 2 is a schematic cross-section of a film of a stretchable laminate.
Figure 3:
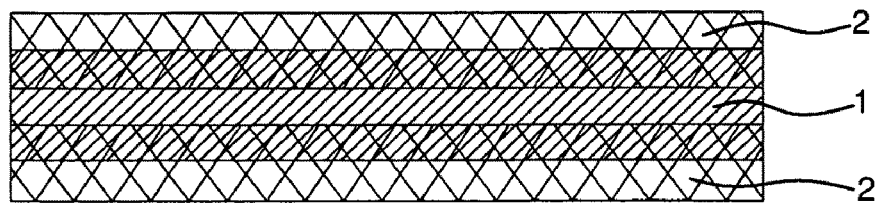
FIG. 3 is a schematic cross-section of a film of a stretchable laminate.

The selectively permeable chemical protective films (11) may comprise more than one layer, such as the multilayer composites exemplified in FIGS. 2 and 3. The layers are selected to provide properties such as permeability to moisture vapor to render the chemical protective films breathable, durability such as wash durability, flex durability, and to provide durability from cracking thereby reducing permeation to chemicals. Porous or non-porous support layers may be provided to one or both sides of a selectively permeable chemical protective layer. Porous support layers may comprise microporous support layers, such as microporous polytetrafluoroethylene (ePTFE). In one embodiment, the selectively permeable chemical protective film (11) comprises a multilayer composite exemplified by the cross-sectional representation of FIG. 3, comprising two porous support layers (2) on either side of a selectively permeable polymer layer (1). A portion of the selectively permeable polymer may reside within the pores of the porous support layers.

In another embodiment, a cross-sectional representation of a selectively permeable chemical protective film comprising a multilayer composite is illustrated in FIG. 2. The multilayer composite comprises a composite support layer (7) on one side of a selectively permeable polymer layer (3) and the selectively permeable polymer (3) is at least partially embedded in a porous support layer (4), such as an expanded polytetrafluoroethylene (ePTFE) support material, on the other side. As depicted in FIG. 2, the composite support layer (7) may comprise a porous layer (5) at least partially penetrated or coated by a non-porous layer (6), such as a polyurethane, which interfaces with the selectively permeable layer (3).

In one embodiment, the stretchable chemical protective material is formed from a stiff selectively permeable chemical protective film (11) which may have a stiffness greater than or equal to about 20 g when tested according to the Stiffness test method described herein. In other embodiments, the selectively permeable films have a stiffness greater than about 30 g, or greater than about 50 g, or greater than about 70 g, when tested according to the Stiffness test method described herein. The selectively permeable chemical protective films (11) for use in the stretchable materials have an elongation less than about 10% at 4 lbf, or less than about 5% at 4 lbf when tested according to the Elongation and Recovery test method described herein, prior to being incorporated into the stretchable materials.

Textiles suitable for forming the stretchable chemical protective materials are elastic, having an elongation greater than about 100% at 4 lbf, or greater than about 200% at 4 lbf, with a recovery of at least about 95% when tested according to the Elongation and Recovery test method described herein. Suitable elastic textiles include elastic knits, and elastic woven or non-woven fabrics. Elastic textiles may comprise synthetic or natural fibers such as nylon, polyester, polypropylene, polyurethane, spandex, cotton, fibers sold under the tradename Lycra, Elaspan, Dorlastan, Linel, and the like and combinations thereof.

One method for making a stretchable chemical protective laminate, such as the material illustrated in FIG. 1, comprises the steps of printing an adhesive (13) on a surface of the selectively permeable chemical protective film (11), stretching the elastic textile (12), and joining the selectively permeable chemical protective film (11) and the stretched elastic textile (12). In a further method step, the adhesive is sufficiently cured so as to bond the selectively permeable chemical protective film to the stretched elastic textile. The load used to stretch the elastic textile is removed and the stretched elastic textile (12) is relaxed, forming a stretchable chemical protective material (10) having a corrugated selectively permeable chemical protective film (11).

Adhesives include, but are not limited to heat-cure adhesives, such as carbamate/polyurethane adhesives disclosed in U.S. Pat. No. 5,209,969 (to Crowther), and moisture cure adhesives, such as U.S. Pat. No. 4,532,316 (to Henn), incorporated by reference herein in their entirety, and commercially available moisture cure adhesives available from Bostik Inc., 11320 Watertown Plank Road Wauwatosa, Wis. 53226 and 3M adhesives available from R. S. Hughes Company, 2605-F Lord Baltimore Dr., Woodlawn, Md. 21244. Alternatively, a hot melt adhesive may also be used, such as polyimide, polyester, polypropylene or polyethylene. The adhesive (13) may be applied discontinuously, for example, as adhesive dots in a spaced configuration. The term dots is meant to include shapes, such as round, pyramidal, diamond, cylindrical, square, dashes, and the like. Where the selectively permeable chemical protective film has a stiffness greater than 20 g, adhesive dot spacing is preferably greater than about 400 um, greater than about 500 um, greater than about 700 um, greater about 800 um, greater than about 1000, greater than about 1500 um or greater than about 2000 um. For the purpose of this invention, the dot spacing is measured from the edge of one dot to the edge of the nearest adjacent dot.

The percent of adhesive coverage is generally less than about 50% of the surface of the selectively permeable chemical protective film. The percent coverage of adhesive may also be less than or equal to about 40%, less than or equal to about 30%, less than or equal to about 20%, less than or equal to about 10%, or less than or equal to about 7% of the surface of the selectively permeable chemical protective film.

To be suitable for use in the form-fitting bodysuits, it is important that the stretchable chemical protective laminates formed by the methods described have an elongation greater than or equal to 30% at 4 lbf, or preferably greater than or equal to about 40% elongation at 4 lbf, or greater than or equal to about 50% elongation at 4 lbf, or greater than or equal to about 60% elongation at 4 lbf, or greater than or equal to about 70% elongation at 4 lbf, and having greater than about 80% recovery after removing the 4 lbf load. High elongation is important for ease of movement of the wearer, and to provide for a form-fitting suit over a range of body shapes and sizes. Laminates comprising the selectively permeable chemical protective films and elastic textiles, made by these methods, have elongation of at least about 30% at 4 lbf, or greater than about 40% at 4 lbf, or greater than about 50% at 4 lbf, or greater than about 60% at 4 lbf, or greater than about 70% at 4 lbf when tested according to the test for Elongation and Recovery described herein. Laminates comprising the selectively permeable chemical protective films and elastic textiles may also be formed having an elongation of greater than 80% at 4 lbf, greater than 90% elongation at 4 lbf, or greater than 100% elongation at 4 lbf, or greater than 120% elongation at 4 lbf, when tested according to the test for Elongation and Recovery described herein. Laminates may also be formed having a recovery of greater than about 90% of its original length, or greater than 95% of its original length.

In one embodiment, a method is provided for making a stretchable chemical protective laminate from a stiff selectively permeable chemical protective film having a stiffness greater than 20 g. The selectively permeable chemical protective film is laminated to an elastic textile by an adhesive that is applied with a dot spacing of greater than or equal to about 400 um to form a stretchable chemical protective laminate. The laminate has an average elongation greater than or equal to about 30% or greater than or equal to about 50%, at 4 lbf and a recovery of greater than about 80% after releasing a 4 lbf load, when tested according to the test methods provided herein for Stiffness, Elongation and Recovery.

In other methods, the selectively permeable chemical protective film having a stiffness greater than about 50 g, or greater than about 70 g, is laminated to an elastic textile by an adhesive applied with a dot spacing of greater than or equal to about 400 um. A stretchable laminate is formed having an average elongation greater than 30%, or greater than or equal to about 50%, at 4 lbf, when tested according to the test methods provided herein for Stiffness, Elongation and Recovery.

In a further embodiment, a method is provided wherein a selectively permeable chemical protective film having a stiffness greater than 50 g, or greater than about 70 g, is laminated to an elastic textile by an adhesive applied with a dot spacing of greater than or equal to about 600 um to provide a stretchable laminate having an average elongation greater than or equal to about 40% at 4 lbf, or greater than 50% at 4 lbf, or greater than 70% at 4 lbf, when tested according to the test methods provided for Stiffness, Elongation and Recovery.

Another method is provided wherein a selectively permeable chemical protective film having a stiffness greater than 50 g, or greater than about 70 g, is laminated to an elastic textile by an adhesive applied with a dot spacing of greater than or equal to 800 um to provide a stretchable laminate having an average elongation greater than or equal to about 50% at 4 lbf, or greater than or equal to about 60% at 4 lbf, or greater than or equal to about 70% at 4 lbf, or greater than 80% at 4 lbf, when tested according to the test methods provided herein for Stiffness, Elongation and Recovery.

In a further method, a selectively permeable chemical protective film having a stiffness greater than 50 g, or greater than about 70 g, is laminated to an elastic textile by an adhesive applied with a dot spacing of greater than or equal to 1500 um to provide a stretchable laminate having an average elongation greater than or equal to about 50% at 4 lbf, or greater than or equal to about 60% at 4 lbf, or greater than or equal to about 70% at 4 lbf, or greater than 80% at 4 lbf, or greater than 100% at 4 lbf, or greater than 120% elongation at 4 lbf, when tested according to the test methods provided herein for Stiffness, Elongation and Recovery.

Stretchable chemical protective laminates and the selectively permeable chemical protective films described herein significantly restrict the transmission of harmful chemicals into and through the films, and are typically non-adsorptive having a BET surface area significantly less than chemically protective activated carbon-based adsorptive materials. Stretchable laminates and selectively permeable films described herein have a BET surface area less than 50 $m^2/g$, less than 25 $m^2/g$, less than 10 $m^2/g$, less than 5 $m^2/g$, or less than 2 $m^2/g$. Carbon-based chemical protective suits typically have a BET surface area greater than about 200 or 300 $m^2/g$.

The stretchable chemical protective laminate has been found to have surprisingly higher flex-durability than non-stretch chemical protective laminate. Lower permeation to chemical vapor after Gelbo flexing is demonstrated for a stretchable chemical protective laminate than for a chemical protective laminate which is not stretchable. The chemical protective laminate is formed having at least 25 percent, or at least 50 percent, less penetration to toxic chemical vapors when formed as a stretchable chemical protective laminate. In one embodiment, a stretchable chemical protective laminate is provided having a permeation to acrylonitrile of less than about 6 $\mu g/cm^2$ after 10 thousand Gelbo cycles when tested according to the Gelbo Flex test method described herein. A stretchable chemical protective laminate has a permeation to acrylonitrile of less than about 3 $\mu g/cm^2$, or less than about 2 $\mu g/cm^2$, after 10 thousand Gelbo cycles when tested according to this method.

Surprisingly, the stretchable chemical protective laminate is also found to have a permeation to mustard gas (HD) of less than about 20 $\mu g/cm^2$ after 10 thousand Gelbo cycles when tested according to the Gelbo Flex test method described herein. The durable stretchable chemical protective laminate may be formed having a permeation to HD of less than about 4 $\mu g/cm^2$, less than about 3 $\mu g/cm^2$, less than about 2 $\mu g/cm^2$ after 10 thousand Gelbo cycles when tested according to this method.

Thus, one embodiment described herein is a method for making a selectively permeable chemical protective material that has low permeation to toxic chemical vapors after flexing. The method comprises the steps of providing a stiff selectively permeable chemical protective film having a stiffness greater than 20 g, or greater than 50 g, and an elastic textile, and joining them to form a stretchable chemical protective laminate by the methods described herein, wherein the stretchable chemical protective laminate is formed having at least 30% elongation at 4 lbf and at least 80% recovery. The material formed by this method is selectively permeable and has at least 25 percent less, or at least 50% less, permeation of acrylonitrile or HD than the selectively permeable material provided as a non-stretchable laminate, after subjecting both of the laminates to at least 10 thousand Gelbo cycles and testing for acrylonitrile or HD permeation.

In another embodiment, the stretchable chemical protective laminate has a high resistance to chemical vapor permeation after laundering. The stretchable chemical protective laminate has a permeation to HD of less than about 20 $\mu g/cm^2$ after 16 laundry cycles when tested according to Chemical Permeation test method after being subjected to the Laundry Procedure, both of which are described herein. Preferably, the stretchable chemical protective laminate has a permeation to HD of less than about 4 $\mu g/cm^2$, after 16 laundry cycles.

The stretchable chemical protective laminates of the present invention have surprisingly lower loudness values when compared to non-stretch chemical protective laminates similarly constructed and comprising the same selectively permeable chemical protective film. In one embodiment, a stretchable chemical protective laminate has a noise measurement of less than or equal to about 5 sones, or less than or equal to about 3 sones, having a reduction in sones of greater than 25%, or greater than 50% sones compared to the non-stretch chemical protective laminate, when tested according to the Noise Measurement test described herein.

In another embodiment, a form-fitting body suit is constructed from the stretchable chemical protective laminate comprising the stiff, selectively permeable chemical protective film. Surprisingly, it has been found that when wearing a form-fitting bodysuit comprising the laminate, a wearer's heat-loss can be significantly improved, whether worn alone or under a uniform.

Figure 6:
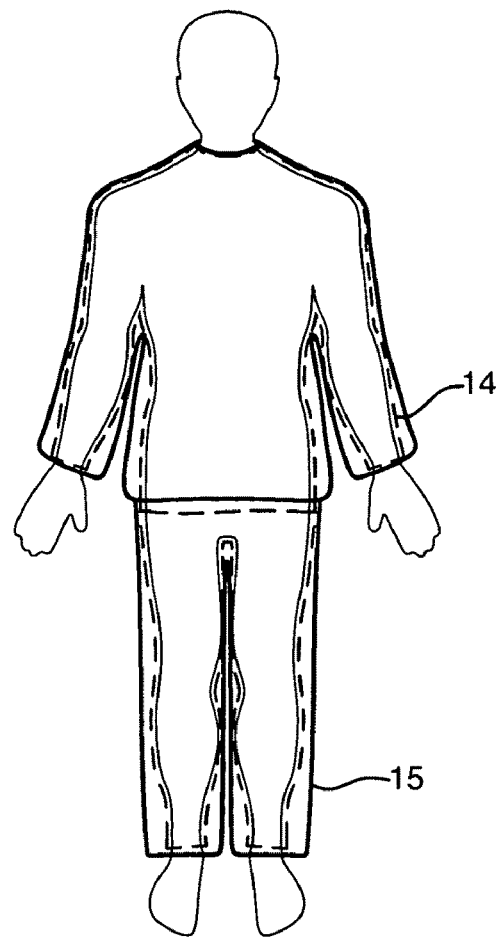
FIG. 6 is a schematic representation of a textile, non-chemical protective uniform over a form-fitting protective suit.

Thus, in one embodiment, a low heat-stress chemical protective suit is formed comprising a form-fitting body suit which provides improved heat loss particularly when tested at high temperature and low humidity conditions. Stretchable laminates having high elongation, ensure a next-to-skin fit to maximize heat loss, and to provide sufficient comfort to the wearer to be worn for an extended time. The bodysuit may be designed, for example, as a one piece suit, such as an overall or coverall, or two-piece suit, wherein one piece covers the torso and arms of a wearer and another piece covers the lower body and legs of a wearer. The bodysuit may be worn with or without an over garment, such as a uniform or other garment that provides little or no protection to chemical or biological threats, as a low heat-stress chemical protective suit. FIG. 5 depicts a two-piece form-fitting body suit (14) worn without any over garment. FIG. 6 depicts a form-fitting body suit (14) and a non-chemical protective uniform (15), worn over it.

In one embodiment, a low heat-stress chemical protective suit is provided, comprising a form-fitting body suit, that has a heat loss greater than about 140 W/m$^2$, or greater than about 150 W/m$^2$, at 35° C. and 60% relative humidity (RH), when tested according to the method for Heat Loss Measurement provided herein.

In another embodiment, a low heat-stress chemical protective suit comprises a form-fitting body suit (14) worn under a non-chemical protective uniform (15) as shown in FIG. 6. The uniform may comprise a high air permeability fabric, such as 330D Cordura® fabric, or may comprise a commercially available Army Combat Uniform (ACU). The form-fitting body suit, provided as a one or two-piece suit, when worn in combination with a uniform, has a heat loss greater than about 100 W/m$^2$, or greater than about 130 W/m$^2$, when tested at 35° C. and 60% RH, or alternatively, a heat loss greater than about 150 W/m$^2$, or greater than about 200 W/m$^2$, or greater than about 240 W/m$^2$, at 45° C. and 15% RH, when tested according to the method described herein for Heat Loss Measurement.

Without intending to limit the scope of the present invention, the following examples illustrate how the present invention may be made and used. While particular embodiments of the present invention have been illustrated and described herein, the present invention should not be limited to such illustrations and descriptions.

Test Methods

Stiffness Test

ASTM test method D6828 entitled "Standard Test Method for Stiffness of Fabric by the Blade/Slot Method" was used to measure the stiffness of the films. This method involves laying a flat 4" by 4" material across a specified gap and then pressing a blade onto the material to force it to move through the gap.

For the purposes of this patent, the following test parameters have been used: the slot width is maintained at 0.25 inches. The beam is 100 grams. In a typical test, a sample is placed on the equipment such that the edges run perpendicular to the slot. The test is initiated, causing the beam to lower and the sample to be forced through the slot on the test table. A peak resistance number is displayed and recorded. The same sample is subsequently turned over and rotated 180 degrees. In this new configuration, again the test is initiated causing the sample to be forced through the slot. The second resistance number is recorded. The procedure is repeated for a sample being rotated 90 degrees (in which the adjacent edges are perpendicular to the slot), generating two more numbers. The four numbers are added to provide a total stiffness number of the sample (taking into account asymmetry and directionality). Numbers reported here are an average total stiffness of individual measurements on at least 3-sibling samples in gms.

Elongation and Recovery Test

ASTM test method D 5035-06 "Standard Test Method for Breaking Force and Elongation of Textile Fabrics (Strip Method)" was used to measure elongation and recovery of the stretch laminate test specimens. Test specimens 1" wide×6" long were cut along the warp direction. Elongation was measured using an Instron® machine using a gauge length of 4". Elongation was defined as percent (%) increase in gauge length upon application of a force; measurements were recorded at 4 lbf. Calculation of % recovery was performed after removing the load, using equation given below.

For measuring the elongation of film and textile test specimens, sample size was 3" wide×8" long, with a gauge length of 4"; elongation measurements were taken at 4 lbf. Percent recovery was calculated as follows.

$$\% \text{ Recovery} = 100 - \frac{(\text{Final Length} - \text{Initial Length}) * 100}{\text{Initial Length}}$$

BET Surface Area Test

ASTM D4820-99 "Standard Test Methods for Carbon Black—Surface Area by Multipoint B.E.T. Nitrogen Adsorption" was used to measure the surface area of the samples Coulter SA3100 Series Surface Area Analyzer was used.

0.5-1.0 grams of sample is placed into a sample tube. The sample is then out gassed at 110° C. for 120 minutes under a helium sparge. After a final weight is taken the sample is placed in the analyzer where it is evacuated under vacuum. A liquid nitrogen dewar is then raised around the sample tube.

The analyzer then pulses in small amounts of nitrogen while measuring the pressure in the sample tube. Eleven points are recorded to interpolate five points between 0.05-0.20 Ps/Po (Ps=Sample pressure, Po=Saturation pressure). With this data, the Brunauer, Emmett and Teller (BET) calculation is used to compute the surface area of the sample.

Gelbo Flex Test

ASTM F392-93 (2004) "Standard Test Method for Flex Durability of Flexible Barrier Materials". The flex tester was placed in an environmentally controlled chamber maintained at 40° C. and 10% relative humidity. Samples were flexed for 10,000 strokes. The flexing action consists of a twisting motion followed by a horizontal motion, thus, repeatedly twisting and crushing the laminate. The frequency is at a rate of 45 strokes per minute. The extent of damage after flexing is determined by measuring the rate of chemical permeation on the flexed samples, based on a corresponding chemical permeation test described herein. 3" diameter samples were cut from the center of the flexed specimen for permeation testing.

Laundry Procedure

Laundry procedure included wash/dry cycles. These were performed on a 24"×24" size sample using a front loading washing machine, also referred to as "Milner Washer". The specifications for the washing machines can be found in MIL-DTL 32101, paragraph 6.11. Any commercial dryer capable of drying items at about 120° F. can be employed. Samples after 16 laundry cycles were subjected to chemical permeation test to access the wash/dry durability of stretch laminates.

Chemical Permeation Test

To determine the chemical protection performance of initial samples, and samples after laundry and Gelbo flexing, standard permeation test methods were used. NFPA 1994, October 2007 edition was used to evaluate permeation resistance against acrylonitrile vapors. The challenge concentration was 350 ppm. In testing stretch laminates, the film side was layered with a 330D Cordura® nylon 66 woven fabric (Style W330d×330d, available from Glen Raven Technical Fabrics, 1831 North Park Ave., Burlington, N.C. 27217) and was exposed to acrylonitrile vapors. The testing location was chosen as the center of the flexed area. A gasket comprising a nominally 0.008 inch thick thermoplastic polyvinylidene fluoride (PVDF), having an outer diameter of 1⅝ inches and an inner diameter of 1 inch was applied to the textile side of each sample, with the gasket centered around the testing location. Heat, at 320° F., and pressure were applied for 90 seconds to secure the gasket to the sample. The purpose of this gasket was to enable a sufficient seal between the test fixture and the sample. The test duration was 1 hour (hr). The permeated acrylonitrile vapors were swept with 1000 ml/min air at 32° C. and 50% RH through a "Heated Total Hydrocarbon Analyzer" equipped with an FID detector (Model 20 available from VIG Industries, Inc., Anaheim, Calif.). The cumulative amount permeated over 60 minutes is reported.

Mustard gas (HD) permeation was measured according to Test Operating Procedure (TOP) 8-2-501 January 2002 edition titled "Permeation and Penetration Testing of Air-Permeable, Semi-Permeable, and Impermeable Materials with Chemical Agents or Simulants (Swatch Testing). The testing was performed by TNO Defence, Security and Safety Labs in Rijswijk, The Netherlands. Liquid challenge/vapor penetration method using dual flow mode was used. The air was maintained at 32° C. and 80% RH whereas the flow rates on the top and bottom of the cell were 250 ml/min and 300 ml/min respectively, The amount of agent challenge was 5 g/m$^2$ of liquid HD. Cumulative permeation of the agent over 24 hours is reported.

Air Permeability Test

ASTM D737-04 "Standard Test Method for Air Permeability of Textile Fabrics" was used. A pressure differential of 125 Pa was maintained and the airflow through the fabric in liter/m$^2$.sec was reported.

Heat Loss Measurement

The bodysuit was tested in accordance with ASTM F 2370-05 standard test method for Measuring Evaporative Resistance of Clothing Using a Sweating Manikin. Twenty-six point sensors were used to measure and control the manikin surface temperature of the head, chest, back, abdomen, buttocks, both left and right upper arm, lower arm, hand, thigh, calf, and foot segments. Measurement Option 1 (measurement of manikin power consumption) in test procedure 8.6 was used under both isothermal (8.1.1) and non-isothermal conditions (8.1.2) to provide heat loss values over a range of simulated environmental conditions.

There were the following departures from the specified procedure in these specific tests:

1. Head, hands, and feet were excluded form the overall power consumption measurement and calculation. These areas were not covered by the sweating skin nor the body suit evaluated.
2. For the non-isothermal environmental condition of 45° C., 15% relative humidity, the manikin surface temperature was set and controlled at 37° C.
3. Evaporative resistance is not reported for these tests. Instead, power consumption of the manikin was measured as stated in calculation 9.1 as H e, power required for sweating areas. This value is reported as Watts/meter$^2$ (W/m$^2$) corrected for surface area of sweating manikin of 1.43 m$^2$.

Noise Measurement

The ISO Standard for Loudness measurement was used to determine noise of the samples. ISO 532-1975 (E) was followed for calculation of loudness (in Sones).

Moisture Vapor Permeation

Moisture vapor transmission rates (MVTRs) were determined using the procedure set forth in U.S. Pat. No. 4,862,730 using potassium acetate as the salt and open pore ePTFE for the waterproof moisture vapor permeable membranes. These membranes nominally had a porosity of between 75% and 80%, average pore size of 0.2 um, with a thickness of approximately 0.04 mm. The environment was maintained at 50% relative humidity. The water bath was maintained at 23±0.5° C. The samples were conditioned on the bath with the salt cup on top for about 15 minutes before starting the test. During the measurements, the knit side of the laminates was facing towards the water bath. The MVTR numbers are reported in the unit of g/m$^2$/day.

EXAMPLES

Selectively Permeable Films

Selectively permeable polymer composite (SP) films used in the examples were made substantially according to Example 2 of commonly owned U.S. Pat. No. 6,395,383 to Maples, incorporated by reference herein in its entirety.

SP Film A was substantially similar to the film used in Class III, Model WZ9430 "Homeland Defender Series Perimeter Suit" available from Blauer Manufacturing Company, inc., Boston, Mass. It was constructed substantially according to FIG. 18 of U.S. Pat. No. 6,395,383, where the void-free substrate comprised a polyurethane coated microporous ePTFE substrate, and exemplified in FIG. 1.

SP Film B was constructed substantially according to FIG. 16, of U.S. Pat. No. 6,395,383, and exemplified in FIG. 2.

A sample of polyurethane coated microporous ePTFE (PU-coated-ePTFE) film used in laminates for waterproof/windproof breathable (WWB) garments was made substantially according to the teachings of U.S. Pat. No. 4,194,041 (to Gore) and U.S. Pat. No. 4,942,214 (to Sakhpara). A sample of dense PTFE film was made substantially according to US Pat. Application No. 2005238872. Both of these film samples were tested for comparison to the SP Film A and B.

The films were tested for bending stiffness and % elongation according to the methods described herein. The results are reported in Table 1.

TABLE 1

| Elongation and Stiffness Properties of Films | | |
|---|---|---|
| Films Type | Average stiffness, gms | % Elongation at 4 lbf |
| PU-coated ePTFE | 10.7 | 48 |
| Dense PTFE | 13.4 | 1.9 |
| SP Film A | 72.5 | 1.6 |
| SP Film B | 55.4 | 1.7 |

SP Films A and B are substantially stiffer, having much lower elongations compared to PU-coated ePTFE and dense PTFE films.

Stretch Textiles

Lycra containing tricot knit from Milliken Co. Spartanburg, S.C. (Style #247579) having a weight of about 1.8 oz/yd$^2$ was used to produce stretchable chemical protective laminates. The knit had an elongation of about 100% at 4 lbf and a recovery of over 95%, when tested according to the methods described herein.

Lamination Gravures

Gravure rolls having a range of dot spacing and adhesive coverage were used in the lamination trials. Their properties are listed Table 2.

TABLE 2

Properties of Gravure Rolls used for Lamination

| Adhesive Dot Spacing, um | Adhesive coverage, % |
|---|---|
| 220 | 48 |
| 360 | 35 |
| 610 | 45 |
| 800 | 12 |
| 1000 | 42 |
| 1500 | 6 |

Lamination Adhesives

Following adhesives were employed for laminating SP Films A and B, and PU-coated-ePTFE films, to the stretch textile.

A Gore™ moisture cure adhesive made substantially according to U.S. Pat. No. 4,532,316 to Henn; a 3M® moisture cure adhesive Grade TS115 HGS purchased from R. S. Hughes Company, 2605-F Lord Baltimore Dr., Woodlawn, Md. 21244; and a Gore™ heat-curing carbamate/polyurethane adhesive made substantially according to U.S. Pat. No. 5,209,969 to Crowther, were obtained for use in lamination.

Comparative Examples 1-5 and Examples 6-12

Samples of laminates comprising a stretch textile, a film (PU-coated ePTFE, SP Film, or SP Film B), and a moisture cure adhesive were prepared as follows.

The film was provided with a discontinuous moisture cure adhesive which was printed on the ePTFE side of the film using a gravure roll coating process. The Gravure roll was pre-heated to a temperature of about 120° C. to melt the adhesive. The stretch textile knit was pre-stretched to about two times its original length on a re-spooler. The knit was brought in contact with the printed side of the film, while maintaining enough tension to keep the knit in the stretched state, to form a package. The package containing the film and the knit was introduced into a nip in a continuous manner to bond them together. The nip roll temperature was maintained at about 50° C. whereas the pressure was maintained at about 50 psi, and the line speed was about 10 feet/min. The package was wound on a take up roll under tension and was allowed to cure for at least 2 days under ambient conditions.

Samples of laminates comprising a stretch textile, a film (PU coated ePTFE or SP Film) and a heat cure adhesive, were prepared as follows. A layer of film was provided with a heat cure adhesive which was printed on the film using a gravure roll coating process. The Gravure roll was pre-heated to a temperature of about 40° C. to melt the adhesive. The stretch textile knit was pre-stretched, in a separate step to about twice its original length on a re-spooler. The knit was brought in contact with the printed side of the film, while maintaining enough tension to keep the knit in the stretched state, to form a package. The package containing the film and stretch textile knit was introduced into a heated nip in a continuous manner to bond them together. The nip roll temperature and pressure were maintained at about 180° C. and about 65 psi, respectively, and the line speed was about 6 feet/min.

The stretch properties of the resulting laminates were measured using Elongation and Recovery Test method described herein. Gravure properties and elongations of the laminates measured at 4 lbf, for various film and adhesive types, are reported in Table 3. All laminates produced had a recovery of equal to or greater than 80% when the 4 lbf load was released. Typical recovery numbers were between 90 and 100%.

TABLE 3

Properties of Laminates

| Example Number | Dot Spacing, um | Film Type | Elongation, % | Adhesive Type |
|---|---|---|---|---|
| Comp. 1 | 220 | PU-Coated-ePTFE | 78 | heat cure |
| Comp. 2 | 220 | PU-Coated-ePTFE | 72 | moisture cure |
| Comp. 3 | 220 | SP Film A | 20 | heat cure |
| Comp. 4 | 220 | SP Film A | 32 | moisture cure |
| Comp. 5 | 360 | SP Film A | 23 | heat cure |
| 6 | 610 | SP Film A | 69 | moisture cure* |
| 7 | 800 | SP Film A | 84 | heat cure |
| 8 | 800 | SP Film A | 78 | moisture cure |
| 9 | 800 | SP Film B | 86 | heat cure |
| 10 | 1000 | SP Film A | 84 | heat cure |
| 11 | 1000 | SP Film A | 62 | moisture cure* |
| 12 | 1500 | SP Film A | 117 | heat cure |

*3M ® moisture cure adhesive; all others are Gore ™ adhesives.

Laminates made with PU-coated-ePTFE films, which have low stiffness, had elongation greater than about 70% (Comparative Examples 1-2). Laminates made with SP Film A, and having dot spacing of 360 um had an elongation of about 23% (Comparative Example 5); laminates made with SP Film A and having a dot spacing of about 220 had an elongation of about 20%, when using a heat curable adhesive, and an elongation of about 32% when using a moisture curable adhesive (Comparative Examples 3 and 4, respectively).

The data indicate that stretchable laminates having an elongation greater than 50% may be constructed with films having a stiffness greater than 20 when laminated to a stretchable textile using a dot spacing greater than 360 μm.

Figure 7:
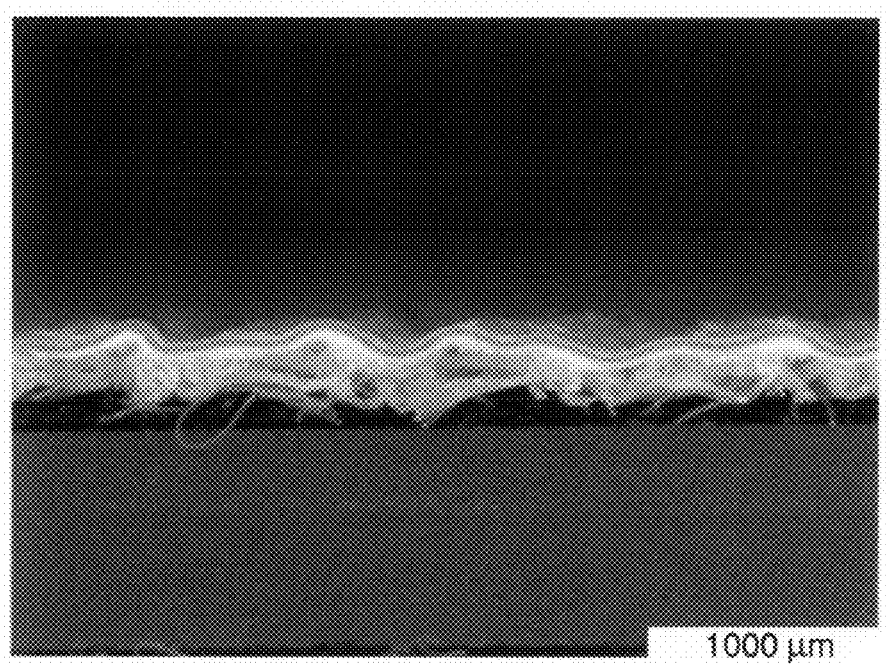
FIG. 7 is an optical photomicrograph of a cross-section of a laminate.
Figure 8:
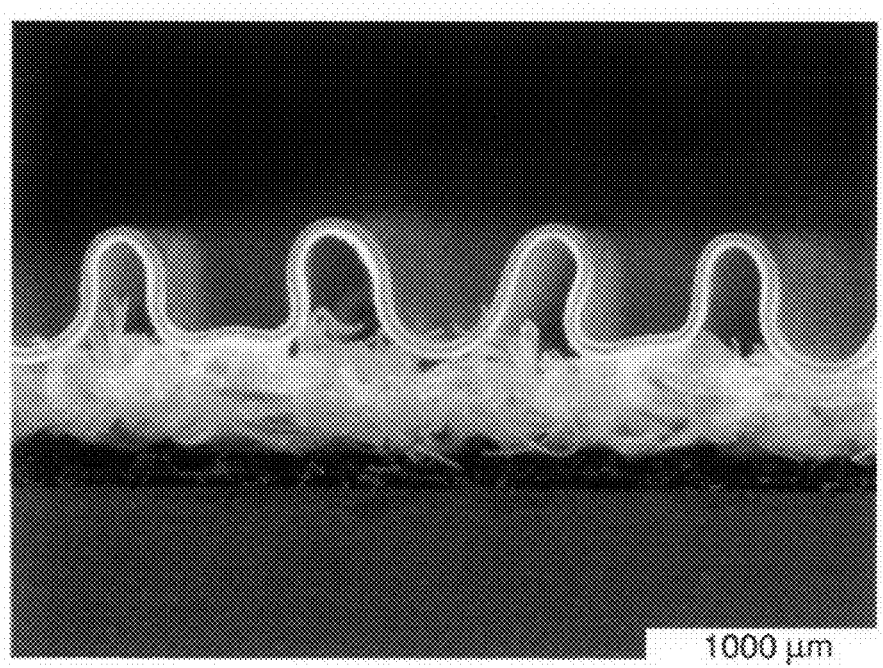
FIG. 8 is an optical photomicrograph of a cross-section of a laminate.

Optical micrographs of a cross-section of laminates of Comparative Example 5 and Example 12 are shown in FIGS. 7 and 8. A laminate made according to Example 12, and having a dot spacing of 1500 um show significant corrugation of the SP film compared to that made according to Comparative Example 5, where the dot spacing was 360 um.

MVTR of Stretch Laminates

Moisture vapor permeation rates (MVTR) of stretch laminates of Examples 5 and 7 were measured according to the procedures described herein. The values were about 5930 and about 5470 g/m²/day, respectively.

Results of Heat Loss Measurements

A bodysuit was constructed out of the stretchable chemical protective laminate formed substantially according to Example 8. The bodysuit (FIG. 5) was formed as a two-piece suit comprising a long sleeved top covering manikin torso and arms, and a bottom covering manikin legs. The bodysuit was tested for heat loss using a thermal, sweating, walking manikin according to the test described herein for Heat Loss Measurement. A wind speed of 2 m/sec was employed.

Three different configurations were tested:
1) a bodysuit by itself as shown in FIG. 5 was constructed from the stretch laminate of Example 8. The bodysuit was constructed so as the knit side of the laminate was facing the body of the wearer;
2) a bodysuit, as in 1) above, with an army combat uniform (ACU), consisting a Nylon/Cotton Ripstop ACU Coat (Part number F545921394) and Nylon/Cotton Ripstop ACU Pants (Part number F520921394) both in Universal Camo Pattern, available from BDU.COM, 1065 Executive Parkway Drive STE 201, St. Louise, Mo. 63141), worn over it as shown in FIG. 6; and
3) a bodysuit as in 1) above, with a uniform having a similar design as the ACU but made out of about 4.5 oz/yd² 330D Cordura® nylon 66 woven fabric (Style W330dx330d, available from Glen Raven Technical Fabrics, 1831 North Park Ave., Burlington, N.C. 27217) worn over the bodysuit (FIG. 6).

The fabric used in ACU had a low air permeability of about 57±2 liter/cm²/min as measured by the air permeability test described herein. The air permeability of the 330D Cordura® fabric was 223±46 liter/cm²/min. Results of heat loss performance are provided in Table 4.

Figure 4:
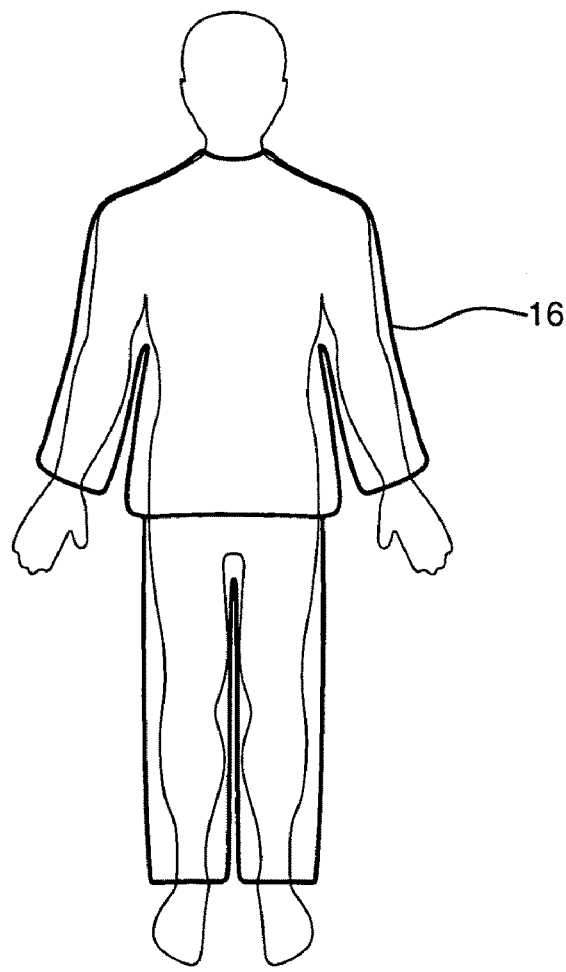
FIG. 4 is a schematic representation of a protective suit.

A comparative non-stretch non-form fitting selectively permeable suit (Class III, Model WZ9430 "Homeland Defender Series Perimeter Suit" available from Blauer Manufacturing Company, inc., Boston, Mass.) as illustrated in FIG. 4 (16) was also tested for heat loss according to the methods described herein. The results of heat loss performance under two different environmental conditions are provided in Table 4.

TABLE 4

Heat Loss Results on Garments

| | Heat Loss, W/m² | |
|---|---|---|
| Garment Type | 25° C. and 60% RH | 35° C. and 60% RH |
| Stretch bodysuit | 488 | 198 |
| Stretch bodysuit + 330D Cordura ® uniform | 309 | 134 |
| Stretch bodysuit + ACU | 255 | 111 |
| Non-stretch selectively permeable suit | 250 | 85 |

The stretch bodysuit, tested with and without outer garments (uniforms) had greater heat loss compared to the comparative non-stretch non-form fitting selectively permeable suit.

Additionally the stretch bodysuit both with a 330D Cordura® uniform and ACU over it was tested at 45° C. and 15% RH. The heat loss measurements were 244 W/m² and 162 W/m² respectively.

Permeation after Laundry

The stretchable chemical protective laminate of Example 10 was tested for permeation to HD after laundry using the procedure described herein. Results are presented in Table 5.

TABLE 5

HD Permeation after Laundry

| Stretchable Laminate | HD permeation, µg/cm² |
|---|---|
| Initial sample | 1.2 |
| After 16 laundry cycles | 3.7 |

The stretchable laminate had good durability, maintaining low permeation to HD after laundering.

Permeation after Gelbo Flex

The stretchable chemical protective laminate of Example 9 and a comparative non-stretch laminate were tested for flex-durability using the Gelbo flex test method described herein. The non-stretch laminate was prepared similarly to Example 9, except the elastic knit was not pre-stretched before lamination. The environmental conditions were about 45° C. and about 10% RH. The flexed samples were tested for permeation performance using acrylonitrile and mustard gas (HD) using the procedures described herein. The results are presented in Table 6.

TABLE 6

Results of Permeation after Gelbo Flexing

| Property | Comparative Non-Stretch Laminate | Stretch Laminate of Example 9 |
|---|---|---|
| Acrylonitrile permeation µg/cm2 - initial | 0.1 | 0.1 |
| Acrylonitrile permeation µg/cm2 after 10K Gelbo cycles | 3.0 | 1.2 |
| HD permeation, µg/cm2 after 10K Gelbo cycles | 4.7 | 1.7 |

When compared to the non-stretch laminate, the stretchable chemical protective laminate had a reduced chemical permeation after Gelbo flexing of more than 50%.

Results of Noise Measurements

A non-stretch laminate was produced using the gravure specifications and lamination procedure described in Example 10, except the knit was not pre-stretched before lamination. Resulting laminate did not have any stretch properties.

The results of noise measurements on laminates using Noise Measurement test method described herein are compared in Table 7.

TABLE 7

Noise of Stretchable and Non-stretch Laminates

| Property | Stretchable Laminate of Example 7 | Stretchable Laminate of Example 10 | Non-Stretch Laminate |
|---|---|---|---|
| Noise, Sones | 3 | 2.8 | 7.4 |

This data suggests a noise reduction of over 50% in stretchable laminates compared to the non-stretch laminate.

I claim:

1. A method of reducing the chemical permeation after 10,000 Gelbo flex cycles in a chemical protective laminate by at least 25 percent comprising:
   forming a chemical protective laminate having a HD permeation of less than 20 µg/cm² comprising
      providing a selectively permeable chemical protective film having a stiffness greater than about 20 g and an elastic textile;
      applying an adhesive with a dot spacing greater than 400 µm to the selectively permeable chemical protective film;
      pre-stretching the elastic textile; and
      laminating the selectively permeable chemical protective film and the elastic textile to form a chemical protective laminate having an elongation greater than about 50% at 4 lbf,
   wherein the chemical protective laminate has an HD permeation that is at least 25 percent less than the same laminate made without the step of pre-stretching the elastic textile.

2. A durable chemical protective material comprising
   a stretchable chemical protective laminate having a permeation to mustard gas (HD) of less than 20 µg/cm² after about 10 thousand Gelbo flex cycles at 40° C. and 10% RH, comprising
      a selectively permeable chemical protective film and
      an elastic textile joined to the selectively permeable film by an adhesive,
   wherein the stretchable chemical protective laminate has an elongation of greater than 50% at 4 lbf, a recovery of greater than 80%, and an MVTR of greater than 1000 g/m²/day.

3. The durable chemical protective material of claim 2 wherein the selectively permeable chemical protective film comprises a polyamine polymer.

4. The durable chemical protective material of claim 3 wherein the selectively permeable chemical protective film comprises at least one porous support layer.

5. The durable chemical protective material of claim 3 wherein the polyamine polymer at least partially resides in the at least one porous support layer.

6. The durable chemical protective material of claim 4 wherein at least one porous support layer comprises expanded polytetrafluoroethylene (ePTFE).

7. The durable chemical protective material of claim 2 wherein the selectively permeable chemical protective film has a stiffness greater than 20 g.

8. A low heat-stress chemical protective suit comprising
a form-fitting bodysuit comprising
a stretchable chemical protective laminate having a permeation to HD of less than 20 μg/cm² comprising
a selectively permeable chemical protective film and
a elastic textile, joined by an adhesive,
the low heat-stress chemical protective suit having a heat loss of greater than 100 W/m² at 35° C. and 60% RH.

9. The low heat-stress chemical protective suit of claim 8, having a heat loss greater than 125 W/m² at 35° C. and 60% RH.

10. The low heat-stress chemical protective suit of claim 8, having a heat loss greater than 140 W/m² at 35° C. and 60% RH.

11. The low heat-stress chemical protective suit of claim 8, wherein the selectively permeable chemical protective film has a stiffness greater than 20 g.

12. The low heat-stress chemical protective suit of claim 8, wherein the selectively permeable chemical protective film has a BET less than 50 m²/g.

13. The low heat-stress chemical protective suit of claim 8, wherein the adhesive is applied discontinuously with a spacing greater than 400 μm.

14. A stretchable laminate comprising
a chemical protective film having a stiffness greater than 20 g,
an elastic textile, and
a discontinuous adhesive having a dot spacing greater than about 400 μm joining the chemical protective film and the elastic textile, the stretchable laminate having an elongation greater than 50% at 4 lbf and a permeation to HD less than 20μg/cm².

15. The stretchable laminate of claim 14, wherein the chemical protective film has a stiffness greater than 30 g.

16. The stretchable laminate of claim 14, wherein the chemical protective film has a stiffness greater than 50 g.

17. The stretchable laminate of claim 14, wherein the chemical protective film has a stiffness greater than 60 g.

18. The stretchable laminate of claim 14, wherein the stretchable laminate has an elongation greater than about 60% at 4 lbf.

19. The stretchable laminate of claim 14, wherein the chemical protective laminate has an MVTR greater than about 1000 g/m²/day.

20. The stretchable laminate of claim 14, wherein the dot spacing is greater than about 800 μm and an elongation greater than about 70% at 4 lbf.

21. The stretchable laminate of claim 14, wherein the dot spacing is greater than about 1500 μm and an elongation greater than about 100% at 4 lbf.

22. A durable chemical protective stretch laminate comprising
a breathable chemical protective film having a stiffness greater than 20 g,
an elastic textile, and
and an adhesive applied in a discontinuous pattern having a dot spacing on the breathable chemical protective film of greater than 400 μm joining the chemical protective film and the elastic textile, the durable stretchable laminate having a permeation to HD of less than about 20 μg/cm² after 10,000 Gelbo cycles.

23. The durable chemical protective stretch laminate of claim 22, having a permeation to HD of less than about 4 μg/cm² after 10,000 Gelbo cycles.

24. The durable chemical protective stretch laminate of claim 22, having a permeation to HD of less than about 3.0 μg/cm² after 10,000 Gelbo cycles.

25. The durable chemical protective stretch laminate of claim 22, having a permeation to HD of less than about 2.0 μg/cm² after 10,000 Gelbo cycles.

26. A method for making a stretchable chemical protective material having a selectively permeable film with a stiffness greater than about 20 g comprising
providing a selectively permeable film having a stiffness greater than about 20 g;
providing an elastic textile;
stretching the elastic textile;
printing adhesive onto the selectively permeable film;
adhering the selectively permeable film to the stretched elastic textile to form a stretchable chemical protective material having a permeation to HD less than 20μg/cm² and having an average elongation of greater than 50% at 4 lbf.

27. The method of claim 26, wherein the adhesive is printed in a discontinuous dot pattern.

28. The method of claim 26, wherein the spacing of the adhesive dot is greater than about 400 μm.

29. The method of claim 26, wherein the spacing of the adhesive dot is greater than about 600 μm.

30. A method of reducing the noise of a chemical protective laminate by at least 25 percent comprising:
forming a chemical protective laminate having a HD permeation of less than 20 μg/cm² comprising
providing a selectively permeable chemical protective film having a stiffness greater than about 20 g and an elastic textile;
applying an adhesive with a dot spacing greater than 400 μm to the selectively permeable chemical protective film;
pre-stretching the elastic textile; and
laminating the selectively permeable chemical protective film and the elastic textile to form a chemical protective laminate having an elongation greater than about 50% at 4 lbf,
wherein the chemical protective laminate has a noise measurement that is at least about 25 percent less than the same laminate made without the step of pre-stretching the elastic textile.

31. The low-heat stress chemical protective suit of claim 8, further comprising an overgarment over the bodysuit.

32. The low heat-stress chemical protective suit of claim 31, having a heat loss greater than 150 W/m² at 45° C. and 15% RH.

33. The low heat-stress chemical protective suit of claim 31, having a heat loss greater than 200 W/m² at 45° C. and 15% RH.

* * * * *